US009386479B2

(12) United States Patent
Douglas et al.

(10) Patent No.: US 9,386,479 B2
(45) Date of Patent: Jul. 5, 2016

(54) METHOD AND APPARATUS OF IMPLEMENTING A BODY AREA NETWORK USING A MESH CONFIGURATION

(75) Inventors: Robert Keith Douglas, San Diego, CA (US); David Jonathan Julian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 584 days.

(21) Appl. No.: 13/477,343

(22) Filed: May 22, 2012

(65) Prior Publication Data

US 2013/0315069 A1    Nov. 28, 2013

(51) Int. Cl.
*H04L 12/28*    (2006.01)
*H04W 28/10*    (2009.01)
*H04W 40/12*    (2009.01)
*H04L 12/707*    (2013.01)

(52) U.S. Cl.
CPC .............. *H04W 28/10* (2013.01); *H04W 40/12* (2013.01); *H04L 45/24* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 6,223,018 B1 * | 4/2001 | Fukumoto et al. | 455/41.1 |
| 7,961,626 B2 | 6/2011 | Reeve | |
| 7,995,501 B2 | 8/2011 | Jetcheva et al. | |
| 2008/0037560 A1 * | 2/2008 | Jia et al. | 370/400 |
| 2008/0080523 A1 | 4/2008 | Karacali-Akyamac et al. | |
| 2010/0142421 A1 * | 6/2010 | Schlicht et al. | 370/310 |
| 2011/0137133 A1 | 6/2011 | Espina Perez | |
| 2011/0269414 A1 | 11/2011 | Falck et al. | |
| 2012/0122461 A1 * | 5/2012 | Hossain et al. | 455/450 |
| 2012/0250546 A1 * | 10/2012 | Hamida et al. | 370/252 |
| 2013/0223229 A1 * | 8/2013 | Hui et al. | 370/238 |

OTHER PUBLICATIONS

International Search Report and Written Opinion—PCT/US2013/042288—ISA/EPO—Sep. 5, 2013.
Mustafa H., et al., "Short Paper: Jamming-Resilient Multipath Routing Leveraging Availability-Based Correlation", Proceedings of the fourth ACM conference on Wireless network security pp. 41-46, (Jun. 14, 2011), XP008164454, Retrieved from the Internet: URL:http://dl.acm.org/citation.cfm?id=1998421, [retrieved on Aug. 27, 2013], p. 43-p. 44.

* cited by examiner

*Primary Examiner* — Willie J Daniel, Jr.
(74) *Attorney, Agent, or Firm* — Steven R. Theil (57) ABSTRACT

Apparatuses and methods that provide for implementing a body area network are disclosed. An example of a method described herein includes determining a plurality of paths from a source node to a destination node in a set of nodes; determining, for each path in the plurality of paths, a Path Figure of Merit (PFM); associating two or more paths in the plurality of paths with a connection based on a total PFM threshold for the connection; and communicating from the source node to the destination node using at least two of the paths associated with the connection. Apparatuses for implementing the methods are also disclosed herein.

80 Claims, 7 Drawing Sheets

| 302 | | 304 | | 306 | | 308 | | 310 | |
|---|---|---|---|---|---|---|---|---|---|
| Before Sort | | Before Association | | After Iteration 1 | | After Iteration 2 | | After Iteration 3 | |
| Inactive Set | Active Set | Inactive Set | Active Set | Inactive Set | Active Set | Inactive Set | Active Set | Inactive Set | Active Set |
| P1 112 | | P4 118 | | | P4 118 | | P4 118 | | P4 118 |
| P2 114 | | P2 114 | | P2 114 | | | P2 114 | | P2 114 |
| P3 116 | | P1 112 | | P1 112 | | P1 112 | | | P1 112 |
| P4 118 | | P5 120 | | P5 120 | | P5 120 | | P5 120 | |
| P5 120 | | P3 116 | | P3 116 | | P3 116 | | P3 116 | |

METHOD AND APPARATUS OF IMPLEMENTING A BODY AREA NETWORK USING A MESH CONFIGURATION

BACKGROUND

1. Field

Certain aspects of the disclosure set forth herein generally relate to mesh networks and, more particularly, to a method and apparatus of implementing a body area network using a mesh configuration

2. Background

Body area networks (BANs), which involve wireless communication between multiple wearable computing devices, make possible applications such as wireless health monitoring or wearable computing. For example, in the healthcare domain, BANs may be used for continuous monitoring and logging of vital patient parameters. Thus, a patient suffering from a high risk of heart attacks would especially benefit from the use of one or more sensor devices placed on, or worn by, the patient and communicating through the use of a BAN because those devices may alert a hospital or health care provider of an impending or occurring heart attack by measuring changes in the patient's vital signs. Other applications of this technology may include the area of sports, military, or security.

Because of its simple hardware configuration and energy efficiency, ultra wideband (UWB) communication is often chosen for implementing BANs. However, UWB signals propagate poorly, if at all, through the human body. Hence, achieving reliable communications between distant, non-line-of-sight, BAN nodes is therefore difficult, often relying on diffracted paths (using creeping waves) or reflections of electromagnetic waves from external objects. If the user is in an environment that does not have many reflectors, such as the outdoors, the quality of the communication between the different devices placed on, or worn by the user will be very poor. For example, communicating signals from a device on a user's left wrist to a device on the user's right ear can be very difficult.

It would therefore be desirable to provide a more robust BAN implementation.

SUMMARY

The following presents a simplified summary of one or more aspects of implementing a body area network using a mesh configuration in order to provide a basic understanding of such aspects as detailed herein. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to various aspects, the detailed aspects described herein relate to apparatuses and methods that provide for wireless communications. An example of a method for wireless communications described herein includes determining a plurality of paths from a source node to a destination node in a set of nodes; determining, for each path in the plurality of paths, a Path Figure of Merit (PFM); associating two or more paths in the plurality of paths with a connection based on a total PFM threshold for the connection; and communicating from the source node to the destination node using at least two of the paths associated with the connection.

In another aspect, an example of an apparatus for wireless communications is described herein, where the apparatus includes means for determining a plurality of paths from a source node to a destination node in a set of nodes; means for determining, for each path in the plurality of paths, a Path Figure of Merit (PFM); means for associating two or more paths in the plurality of paths with a connection based on a total PFM threshold for the connection; and means for communicating from the source node to the destination node using at least two of the paths associated with the connection.

In yet another aspect, an example of an apparatus for wireless communications that includes a processing system is described herein. The processing system is configured to determine a plurality of paths from a source node to a destination node in a set of nodes; determine, for each path in the plurality of paths, a Path Figure of Merit (PFM); associate two or more paths in the plurality of paths with a connection based on a total PFM threshold for the connection; and communicate from the source node to the destination node using at least two of the paths associated with the connection.

In still yet another aspect, an example of a computer-program product for wireless communications is described herein. The computer-program product includes a machine-readable storage medium comprising instructions executable to determine a plurality of paths from a source node to a destination node in a set of nodes; determine, for each path in the plurality of paths, a Path Figure of Merit (PFM); associate two or more paths in the plurality of paths with a connection based on a total PFM threshold for the connection; and communicate from the source node to the destination node using at least two of the paths associated with the connection.

To further expand on the accomplishment of the foregoing and related ends, the one or more aspects provided in this summary are fully described herein and particularly pointed out in the claims. The following description and the annexed drawings set forth in detail certain illustrative examples of the one or more aspects. These examples are indicative of, however, but a few of the various ways in which the principles of the various aspects may be employed. Thus, the described examples are intended to include all such aspects and their equivalents.

BRIEF DESCRIPTION OF THE DRAWINGS

So that the manner in which the above-recited features of the disclosure set forth herein can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Further, although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The teachings herein may be incorporated into, implemented within, or performed by, a variety of wireless apparatuses, or nodes. In some aspects, a wireless node implemented in accordance with the teachings herein may comprise a body-mounted node, a stationary estimator node, an access point, an access terminal, etc. Aspects of the disclosure set forth herein may support methods implemented in BANs. The BAN represents a concept of a communication network placed on a body for purposes of diagnoses in medicine, continuous body monitoring, and other communication applications.

As used herein, a link is understood to be a direct communication channel between two nodes. In other words, communications on a link from a first node to a second node do not pass through an intermediate node. A path is understood to be a communication channel between a source node and a destination node, which may or may not pass through an intermediate node. Thus, a path may include one or more links forming a contiguous set of links from the source node to the destination node. A connection is understood to include a subset of two or more paths selected from a set of total possible paths between a source node and a destination node. The selected subset of paths may be referred to herein as being a set of paths that are "associated" with the connection. The set of paths associated with a connection may also be referred to as an active set (of paths). The subset of paths that may be considered for association with the connection but are not associated therewith is referred to as an inactive set (of paths). Unless otherwise noted, references to "an active set of paths", "paths in an active set", "active paths", "active set", and "paths associated with a connection" should be understood to be interchangeable when used to reference the particular group of paths actively being used by the connection in communicating between the source node and the destination node. Similarly, unless otherwise noted, references to "an inactive set of paths", "paths in an inactive set", "inactive paths", "inactive set", and "paths not associated with a connection" should be understood to be interchangeable when used to reference the particular set of paths not being actively used by the connection to communicate between the source node and the destination node. Further, active paths may become inactive paths when they are removed from a set of active paths. These paths may be referred to as having been disassociated from the set of active paths.

A method and system for creating a BAN using a multiplicity of UWB transceivers, or nodes, in a mesh configuration is disclosed herein. For each pair of nodes in the BAN, the mesh configuration provides a connection between a source node and a destination node. In one aspect of the disclosed approach, a plurality of paths is determined between the source node and the destination node, and a Path Figure of Merit (PFM) is calculated for each path in the plurality of paths. One or more of the paths in the plurality of paths may then be associated with the connection based on a total PFM threshold for the connection, and communication between the source node and the destination node may be made using the associated paths. Further, in another aspect of the disclosed approach, a periodicity of the PFM over time may be detected, and one or more paths in the plurality of paths may be associated with the connection based on the periodicity.

By utilizing more than one path to transmit a data packet, the disclosed approach increases the likelihood that the packet will successfully reach the destination. For example, to transmit packets from a user's wrist (e.g., watch) to the user's opposite ear (e.g., headset), the packets may be transmitted simultaneously to the users' pocket (e.g., phone), foot (e.g., pedometer), and neck (e.g., necklace) as intermediate nodes, as well as directly to the opposite ear. The intermediate nodes act as relays, each re-transmitting their received packets. The intended destination node may relay information back about the most successful paths to minimize parameters such as power consumption/traffic interference so that only a subset of the possible paths are used to simultaneously transmit the data packets from the source node to the destination node. From a complete BAN system point-of-view, because utilizing intermediate nodes to relay packets uses more power than simply transmitting a packet from the source node to the destination node, different thresholds may be provided to make a power-versus-quality of service (QOS) trade-off by choosing the number of re-transmissions or links that are allowed for a given packet. In various aspects of the disclosed approach, QOS may include parameters related to reliability, delay, and/or errors. Power considerations may include total power to be expended, power to be expended for each node, power left on each node, and a variety of other factors. Other factors and parameters are disclosed herein.

Figure 1:
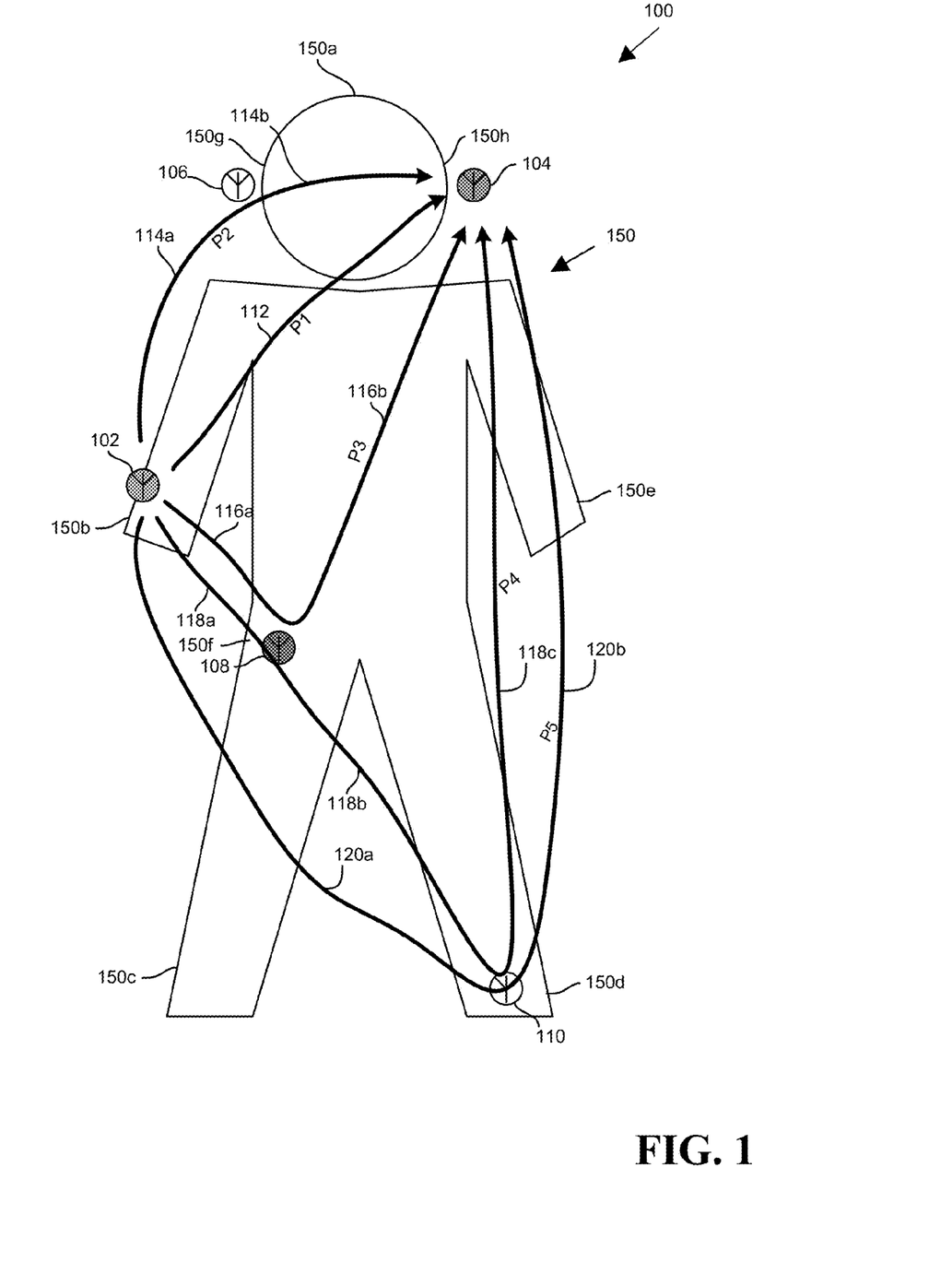
FIG. 1 is a diagram illustrating an example of a Body Area Network (BAN) utilizing a mesh configuration in accordance with certain aspects of the disclosure set forth herein.

For example, FIG. 1 illustrates a BAN 100 on a body 150 having a node 102 on a right wrist 150b, a node 104 on a left ear 150h, a node 106 on a right ear 150g, a node 108 on a right hip 150f, and a node 110 located on a left foot 150d. Each of the nodes may represent a product with a wireless device contained therein. For example, the node 102 may be a bracelet; the nodes 104, 106 may be a pair of earrings or the two headphones of a headset; the node 108 may be a mobile phone; and the node 110 may be a pedometer or a shoe. Nodes may also be placed on various other parts of the body 150, including a scalp portion 150a, a left wrist 150e, and a right foot 150c. The examples provided herein for the types of products in which the nodes are implemented are meant to be examples for various types of products in which a node may be included and not intended to be limiting.

As illustrated, the BAN 100 includes five paths P1 112, P2 114, P3 116, P4 118, and P5 120, that represent one possible set of paths from a source node such as the node 102 on the right wrist 150b and a destination node such as the node 104 on the left ear 150h. An example of a path that is not included in the example in order to simplify the illustration, but may be included, is a path from the node 102, the node 106, the node 108, through the node 104. Using the five paths P1 112, P2 114, P3 116, P4 118, and P5 120, an example connection may include two paths P2 114 and P3 116 in the active set of paths, and three paths P1 112, P4 118, and P5 120 in the inactive set of paths. Another example connection may include three paths P1 112, P2 114, and P3 116 in the active set of paths, and two paths P4 118 and P5 120 in the inactive set of paths As described above, each path may include one or more links, where each link is defined to be a direct communication channel between two nodes. For example, the path P1 112 is a single link path that includes a link between the source node 102 and the destination node 104. The path P2 114 is a two link path that includes a first link 114a from the node 102 to the node 106, and a second link 114b from the node 106 to the destination node 104. The path P3 116 also includes two links 116a and 116b that connect the source node 102 to the node 108, and the node 108 to the node 104, respectively. The path P4 118 is a three link path that includes a link 118a from the source node 102 to the node 108, a link 118b from the node 108 to the node 110, and a link 118c from the node 110 to the destination node 104. The path P5 120 includes a link 120a from the source node 102 to the node 110, and a link 120b from the node 110 to the destination node 104.

Figure 2:
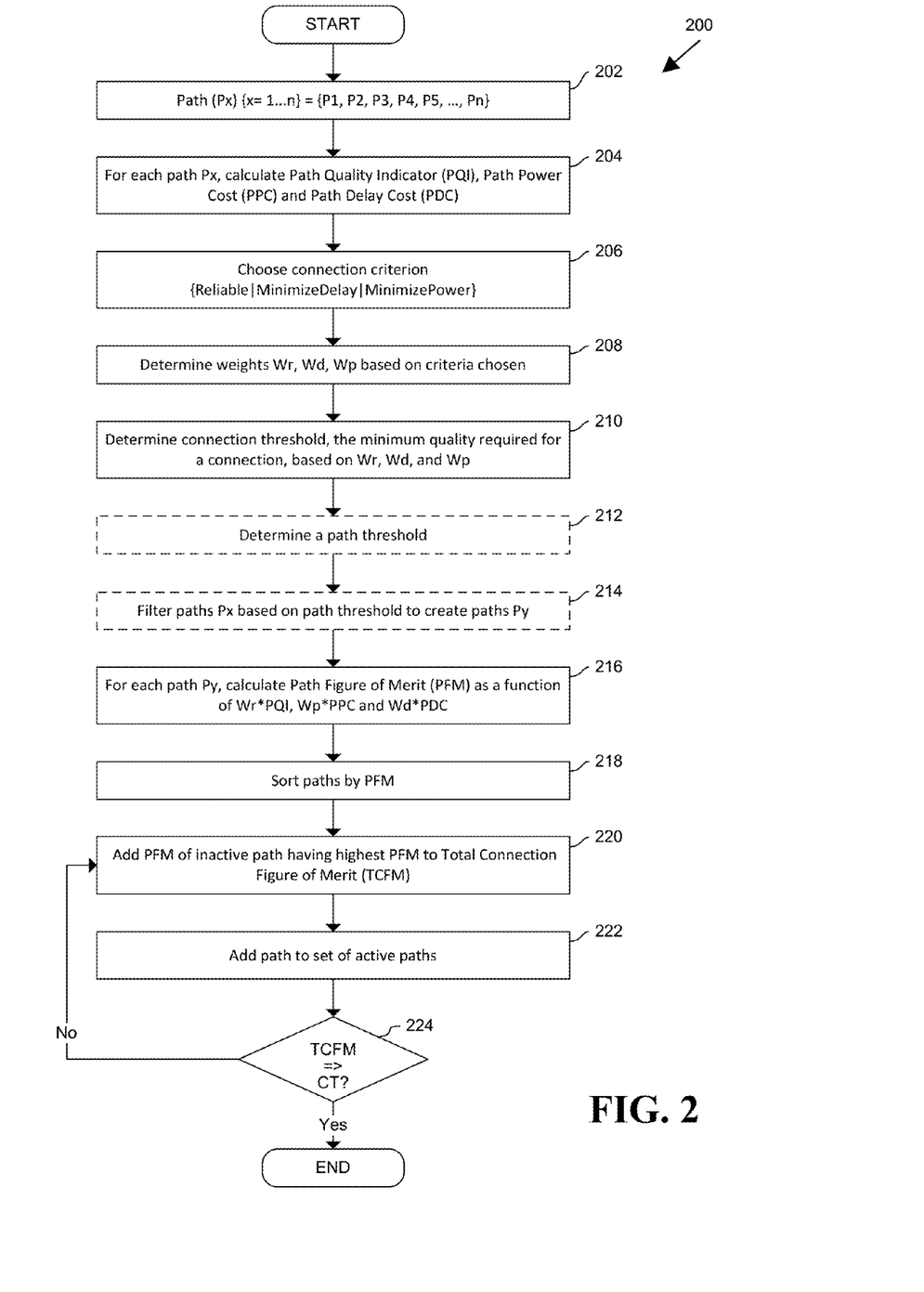
FIG. 2 is a flow diagram illustrating a set-up operation for a connection in a BAN using a mesh configuration in accordance with certain aspects of the disclosure set forth herein.

FIG. 2 illustrates a set-up operation 200 for a connection between a source node such as the source node 102 of FIG. 1, and a destination node such as the destination node 104 where, at 202, a plurality of paths Px, where x ranges from 1 to n, n being the total number paths that may be considered for association with a connection, is determined.

At 204, for each path Px, path characteristics such as a Path Quality Indicator (PQI), a Path Power Cost (PPC), and a Path Delay Cost (PDC) are determined In one aspect of the disclosed approach, the PQI may be based on such parameters as a packet transmission success or failure rate, a link margin, and a path Ep/No estimate. The packet transmission success or failure rate may be measured on a bit-level or a packet level. The link margin, measured in dB, is the difference between a receiver's sensitivity and an actual received power. The PDC may be based on such parameters as the number of links, or hops, and/or maximum data rate available for a node. The PPC may be based on a current battery level, and/or total battery level for a node, and/or how often a node is recharged.

Other parameters for PQI, PPC, and PDC, or any other characteristic that may be of interest may be used, and the previous listing is not to be understood as limiting. In addition, some of the parameters described herein may be determined over one or more of the links in the path or over the path as a whole. For example, the packet transmission rate for the path P5 120 may be the lowest packet transmission success rate or the highest packet transmission failure for the links 120a and 120b that make up the path 120. As another example, the link margin for the path P3 116 may be the lowest link margin of the links 116a and 116b that make up the path P3 116.

In various aspects of the disclosed approach, the parameters disclosed herein may be obtained by the source node 102 from received messages or other obtained signals. For example, one or more parameters may be fed back from the destination node 104 to the source node 102 via one or more messages. The source node 102 may receive reports of various parameters from other nodes (e.g., other nodes of the path and/or other nodes of the BAN that are not part of the path) at particular intervals or after querying those nodes. The source node 102 may also acquire information when it is acting as a destination node or an intermediate node.

At 206, a connection criterion is chosen to achieve a desired type of performance based on a plurality of connection type criteria. In various aspects of the disclosed approach, possible connection type criteria may emphasize reliability, minimize delay, or minimize power. Multiple connection type criteria may be chosen to achieve the connection criterion. For example, it may be important to both increase reliability and minimize delay for a particular connection.

At 208, after the connection type criteria is chosen, a plurality of weights Wr, Wd, and Wp, corresponding to connection type criteria of reliability, delay, and power, respectively, are determined. In one aspect of the disclosed approach, each weight corresponds to the emphasis to be placed on each particular connection type criterion. For example, where it is important for the connection to be reliable, the weight Wr may be set to 1, while the other weights Wd and Wp may be zero or a relatively lower value compared to Wr.

At 210, a connection threshold, which specifies the minimum desired characteristics for the connection between the source node and the destination node, is determined In one aspect of the disclosed approach, the connection threshold may be determined based on the following function:

$$CT = f(Wr*PQI_{thresh}, Wd*PDC_{thresh}, WP*PPC_{thresh}), \quad (1)$$

where CT is the connection threshold, and $PQI_{thresh}$, $PDC_{thresh}$, and $PPC_{thresh}$ are the acceptable threshold levels of PQI, PDC, and PPC, respectively, for the connection. As further described herein, the connection threshold may be used to determine how many paths may be included in the active set of the connection.

At 212, a path threshold may be determined In various aspects of the disclosed approach, a particular connection may also require that each path to be added to the active set have a certain level of one or more characteristics. For example, it may be desirable to consider only paths that have a minimum data rate for association with the active set. In one aspect of the disclosed approach, the path threshold may be determined based on the following function:

$$PT = f(PQI_{thresh\_path}, PDC_{thresh\_path}, PPC_{thresh\_path}), \quad (2)$$

where PT is the path threshold and $PQI_{thresh\_path}$, $PDC_{thresh\_path}$, and $PPC_{thresh\_path}$ are the acceptable levels of PQI, PDC and PPC for the path. It should be noted that each path may be filtered based on an examination of a particular criterion—e.g., PQI only, PDC only, PPC only, or a combination thereof. The path threshold is used to filter the set of inactive paths, as described below.

At 214, the paths Px from the process at 202 may be filtered by the path threshold to reach a filtered set of paths Py, where y=1 ... m, m being the number of paths left in the inactive set after the filtering by the path threshold, where m≤n.

The process from 212 to 214 may be optional if all paths should be considered for association with the active set of the connection. Thus, no filtering will be performed in this alternate approach. In this latter scenario, all paths to be considered will remain in the inactive set of the connection until and unless the paths are associated with the connection (i.e., moved to the active set). Thus, until a path is associated with the connection (i.e., moved to the active set), it will remain in the inactive set. Where the path threshold is used, only the paths that pass through the filter at 214 will remain in the inactive set for consideration for association with the connection.

At 216, a Path Figure of Merit (PFM) will be determined for each path in the active set, where:

$$PFM = f(W_r * PQI, W_p * PPC, W_d * PDC), \quad (3)$$

where PQI, PPC, and PDC represent the characteristics of the particular path for which the PFM is being determined. Thus, in one aspect of the disclosed approach, each of the paths will be characterized by a function of $W_r*PQI$, $W_p*PPC$, and $W_d*PDC$. For example, the PFM may be proportional to $W_r*PQI$, and inversely proportional to $W_p*PPC$ and $W_d*PDC$.

Figure 3:
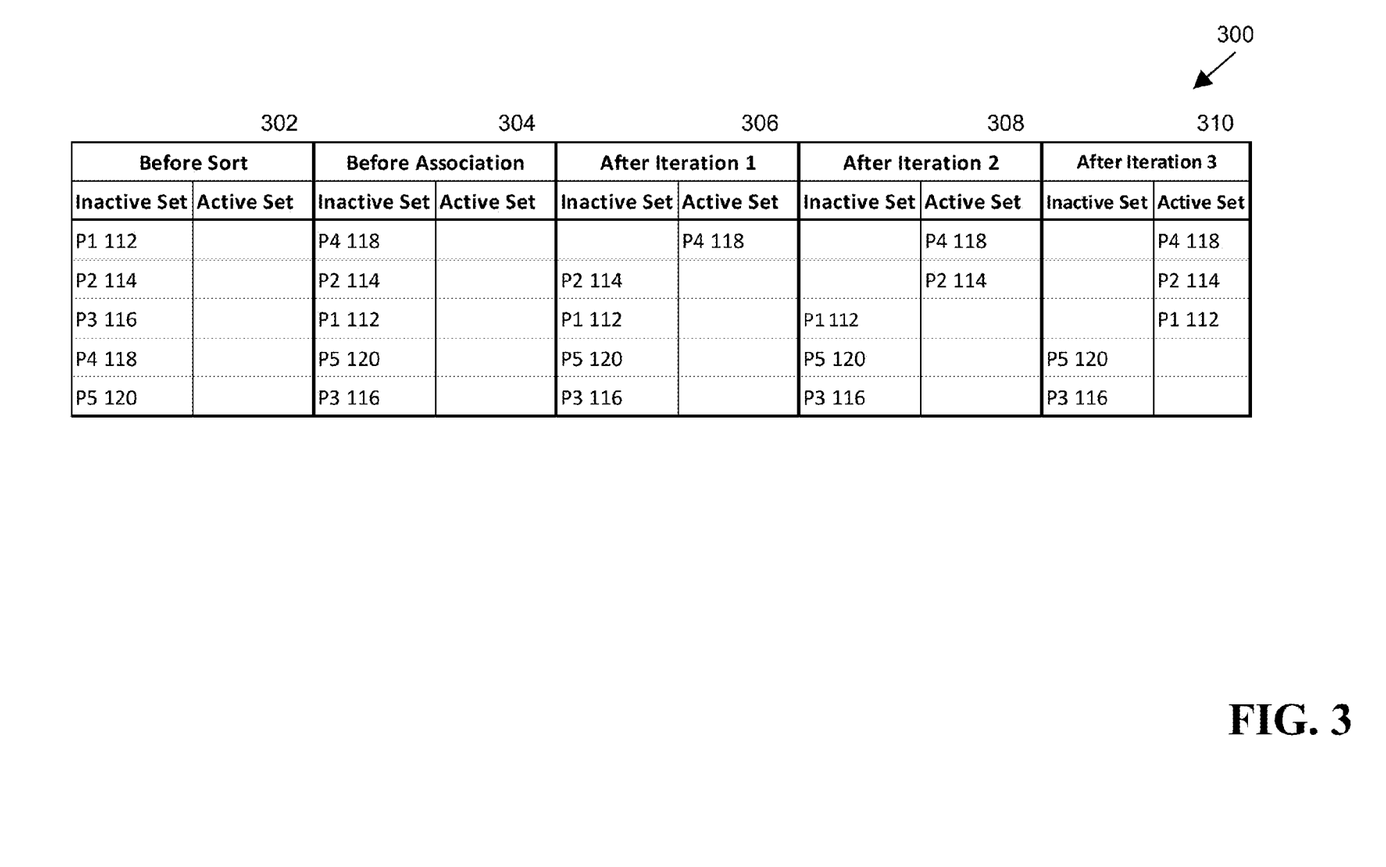
FIG. 3 is a table illustrating an example of the set-up operation of FIG. 2 in accordance with certain aspects of the disclosure set forth herein.

At 218, the paths in the inactive set are sorted by the determined PFMs. In one aspect of the disclosed approach, the paths are sorted from a highest PFM to a lowest PFM. For example, returning to FIG. 1, if the order of magnitude of the PFMs of the paths P1 112, P2 114, P3 116, P4 118, and P5 120 is as follows:

$$P4\ 118 > P2\ 114 > P1\ 112 > P5\ 120 > P3\ 116, \quad (4)$$

where the path P4 118 has the highest PFM, the path P2 114 has the next highest PFM, and so forth until the P3 116, which has the lowest PFM, then the list of paths in the inactive set will be ordered in this fashion:

$$\{P4\ 118,\ P2\ 114,\ P1\ 112,\ P5\ 120,\ \text{and}\ P3\ 116\}, \quad (5)$$

where FIG. 3 illustrates a table 300 with columns 302 and 304 showing the list of paths before and after, respectively, the sorting operation at 218.

At 220, based on the determined PFMs, the PFM of the path with the highest PFM in the inactive set will be added to a Total Connection Figure of Merit (TCFM). Continuing with the above example, the PFM for the path P4 118 will be added to the TCFM. In one aspect of the disclosed approach, multiple paths may be required in the active set of a connection so that any packets transmitted from the source node to the destination node may be communicated over a mesh configuration. As further illustrated below, through multiple iterations of the process from 220 through 222, the PFMs of the paths in the inactive set with the higher PFMs, in the order from higher to lower PFMs, may be added to the TCFM.

At 222, the path with the highest PFM in the inactive set at 220 will be moved to the active set. Hence, continuing with the above example and again referring to FIG. 3, a column 306 of table 3 illustrates that the path P4 118 may be moved to the active set during the first iteration. The paths P2 114, P1 112, P5 120, and P3 116 remain unassociated with the connection (i.e., these paths remain in the inactive set). As noted above, multiple paths may be required in the active set of a connection. Thus, also as further illustrated below, through multiple iterations of the process from 220 through 222, multiple paths in the inactive set with the higher PFMs, in the order from higher to lower PFMs, may be added to the set of active paths.

At 224, it is determined if the TCFM, which includes the PFMs of all currently added paths, is higher than or equal to the connection threshold determined in 210. If the TCFM is higher than or equal to the connection threshold (denoted as "CT" in the figure), then together the paths in the active set of the connection meet the desired level of performance to carry the packets between the source node and the destination node, as specified by the connection criterion at 206, and the connection setup is complete. If the TCFM is lower than the connection threshold, then operation will return to 220. In the example, during the first iteration from 220 through 222, only the PFM from the path P4 118 is added to the TCFM. In other words, the TCFM only contains the PFM from the path P4 118 as the path P4 118 is the only path in the set of active paths for the connection (i.e., the only path associated with the connection). Assuming the TCFM is not higher or equal to the connection threshold, then operation will return to 220, where more paths from the set of inactive paths may be associated with the connection.

Figure 4:
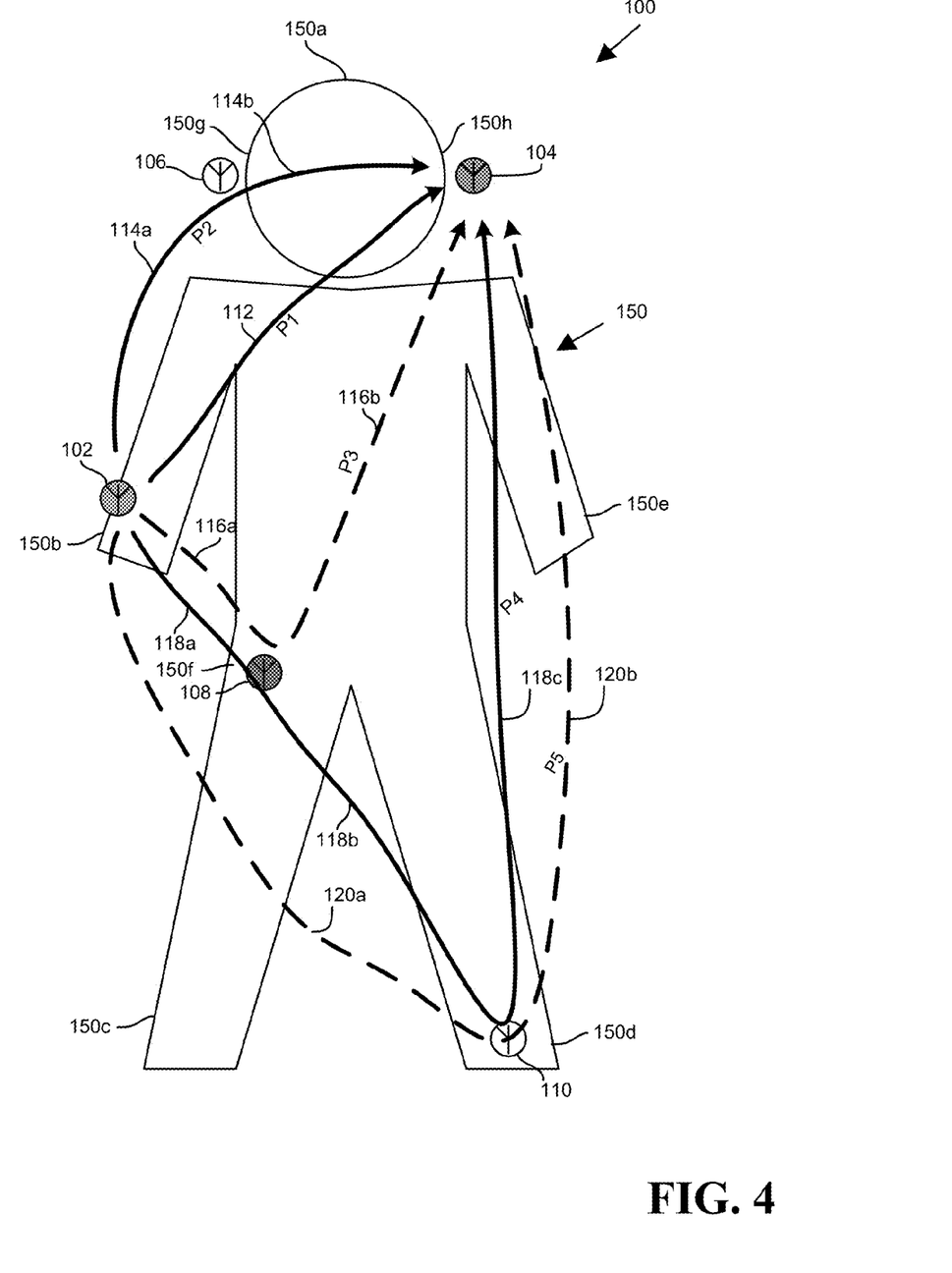
FIG. 4 is a diagram illustrating an example of a connection established in the BAN of FIG. 1 in accordance with certain aspects of the disclosure set forth herein.

Returning to 220, the PFMs of the paths in the inactive set are examined so that the PFM of the path with the highest PFM will be added to the TCFM. Thus, during a second iteration of the process from 220 through 222, the second previously highest PFM path in the inactive set, which is now the highest PFM path, will be added to the active set. Multiple iterations of the process from 220 through 222 may be required, where the highest PFM path in the inactive set, as modified by each iteration, is associated with the connection and its respective PFM is added to the TCFM. Returning to the example, during a second iteration, the PFM of the path P2 114 may be added to the TCFM (which includes the PFM from the path P4 118). Again referring to FIG. 3, a column 308 of table 3 illustrates that the path P2 114 may be moved to the active set along with the path P4 118. During a third iteration, the PFM of the path P1 112 may be added to the TCFM (which includes the PFM from the paths P2 114 and P4 118). Again referring to FIG. 3, a column 310 of table 3 illustrates that the path P1 112 may be moved to the active set, along with the paths P2 114 and P4 118. Assuming the TCFM is above or equal to the connection threshold, the connection is set-up with the paths P1 112, P2 114, and P4 118. FIG. 4 illustrates the exemplary connection having associated paths P1 112, P2 114, and P4 118, and inactive paths P3 116 and P5 120 not being associated with the connection.

In general, through the iteration of the process from 220 through 224, enough paths will be moved to the active set from the inactive set to create a connection with a characteristic that meets the connection criterion based on the connection type criteria for the transmission of data from the source node to the destination node.

As disclosed above, the data packets may be transmitted over all the paths in the active set of a connection simultaneously. In one aspect of the disclosed approach, the data packets may be transmitted using a multicast technique, which is a transmission of one message to multiple nodes simultaneously. In the multicast technique, the message may be addressed to the multiple nodes, as opposed to a broadcast technique, which broadcasts the message to all nodes by, for example, addressing the message to a special address. The multicast technique is also different from a unicast technique, where the message is addressed to only one node. Thus, according to the multicast technique, the source node may address the message to multiple nodes and wirelessly transmit the message only once. The wireless message propagates to the multiple nodes (and perhaps to other nodes to which the message is not addressed, such nodes may be configured to discard or ignore the message). Then, each of the multiple nodes to which the message is addressed receives the single transmission of the message performed by the source node. In another aspect of the disclosed approach, the data packets may be transmitted using a plurality of unicasts, where the message is individually addressed to each node, and transmitted in a sequential manner.

Figure 5:
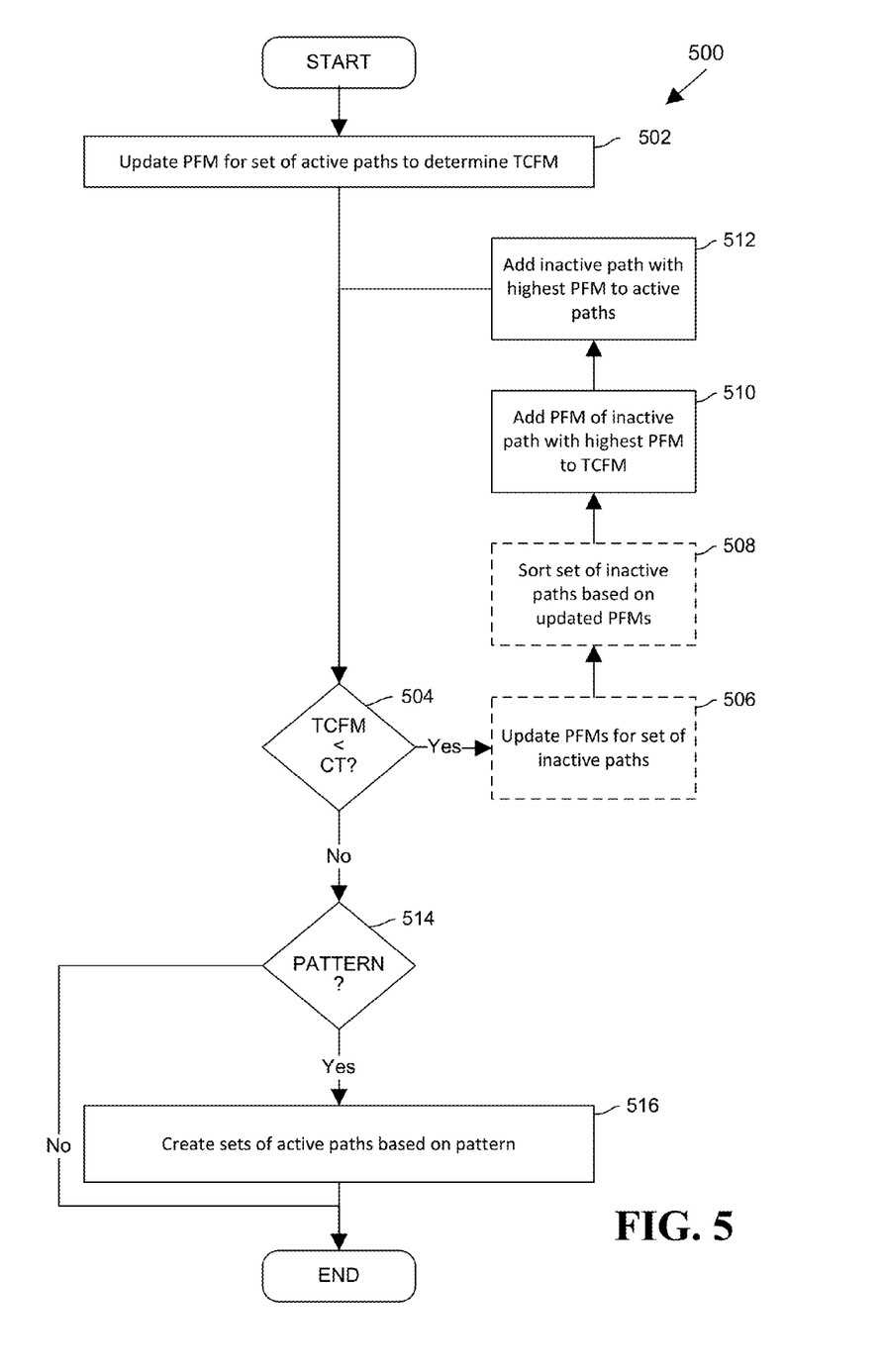
FIG. 5 is a flow diagram illustrating an update operation for the connection of FIG. 2 in accordance with certain aspects of the disclosure set forth herein.

Further, in one aspect of the disclosed approach, the connection established in FIG. 2 may be updated from time-to-time. FIG. 5 illustrates an update process 500 configured in accordance with one aspect of the disclosed approach for updating the connection between a source node such as the source node 102 of FIG. 1, and a destination node such as the destination node 104 where, at 502, the PFM of each path in the set of active paths is updated to determine a current TCFM. The update of the PFMs of the paths is necessary as channel conditions may be change occasionally. For example, the left ear 150*h* of the body 150 may be moved closer to the right hip 150*f* but farther away from the left foot 150*d*, thereby bringing the node 104 closer to the node 108 but farther away from the node 110. Thus, the channel conditions of the paths P3 116, P4 118, and P5 120 will be altered. Further, node conditions may change as well. For example, a node may suffer from a low battery condition, or some sort of malfunction. It should be understood that channel conditions may change for any number of reasons, and it is desirable to update the PFMs of each path in the set of active paths from time-to-time to allow the system to address these changes.

As discussed above, information necessary for updating the PFMs may be specifically requested by a source node or obtained during normal operation of the BAN 100. In the latter case, the information may be captured by the source node when it receives and/or forwards a message for another node. The source node may also listen to transmissions of other nodes that may include the information, whether or not the source node is an intended recipient of that information. Thus, any node that becomes the source node may take advantage of, and reuse, measurements it previously obtained, to prevent additional message passing and optimize total system power consumption. Further, a non-source node may determine the PFM up to the non-source node, and not relay a packet if the PFM is already below the threshold. In this way, system resources may be saved.

Once the PFM for each path in the set of active paths have been updated, operation continues at 504, where it is determined if the current TCFM has fallen below the previously determined connection threshold. If so, then it may be assumed that the current paths in the set of active paths cannot support communication at a level required by the threshold for the connection originally set during the connection set-up operation 200 of FIG. 2. Thus, the connection may be updated to include additional paths from the set of inactive paths in an attempt to satisfy the connection criterion determined earlier and represented by connection threshold. In another aspect of the disclosed approach, instead of updating the connection as further described herein, the connection set-up process 200 of FIG. 2 may be used to construct a new connection. The latter approach may not be desirable as a connection set-up may require significantly more resources than a connection update.

In order to determine which paths in the set of inactive paths to add, operation may continue at 506, where in one aspect of the disclosed approach, the PFMs of the inactive paths are updated so that the selection of the paths in the inactive set of paths to associate with the connection will be optimized. In another aspect of the disclosed approach, it should be noted that it may be desirable to skip 506 because of the additional resources that may be needed to perform the update. As discussed earlier, the disclosed approach attempts to satisfy the connection criterion using multiple paths while minimizing use of system resources. Each active path associated with the connection adds to the use of system resources. Conversely, each inactive path represents a savings in system resources as the nodes that are included in inactive paths are generally assumed to be either powered down or in a low-power state. The PFM update process may require these nodes to consume resources so that PFM-related information may be gathered by the source node. Alternatively, if a node that belongs to an inactive path is already a part of an active path, the information may be gathered with little impact on system resource use if the node is already power-up and communicating. Consequently, in yet another aspect of the disclosed approach, it is contemplated that the PFMs for only some of the paths in the set of inactive paths may be updated.

Assuming the PFMs for the paths in the set of inactive paths are updated at 506, the set of inactive paths will be sorted by the updated PFMs at 508. In one aspect of the disclosed approach, the set of inactive paths are sorted in a descending order to allow the inactive path with the highest PFM to be listed first. If the PFMs for the paths in the set of inactive paths are not updated at 506, it should follow that there is no need to sort the set of inactive paths as the order of the paths should still remain sorted based on the sort performed at 218 of FIG. 2 using the originally determined PFMs.

At 510, the PFM for the path in the set of inactive paths with the highest PFM is added to the current TCFM. This inactive path is also associated with the connection at 512. In other words, the path from the set of inactive paths with the highest PFM will be moved from the set of inactive paths to the set of active paths. Operation will then return to 504, where the TCFM, now updated to include the PFM from the path in the inactive set of paths having the highest PFM, is compared again to the connection threshold to determine if the updated TCFM is still below the connection threshold. If so, then the process from 506 to 512 will be repeated to add the PFM of the inactive path with the (now) highest PFM to the current TCFM.

If the updated TCFM (determined based on the PFMs updated at 502), has not fallen below the connection threshold, as determined at 504, then the paths in the set of active paths are still able to service the connection at a level required by the connection threshold. Thus, no changes in the set of paths associated with the connection appear to be needed and operation may continue with 514. Alternatively, if the updated TCFM (altered based on the addition of one or more PFMs from the paths in the inactive paths from 506 to 512), is now equal or higher than the connection threshold, then the paths in the updated set of active paths may be able to service the connection at a level required by the connection threshold. Thus, operation may continue with 514.

At 514, it is determined if a pattern of the PFMs of one or more paths may be detected. For example, where the source node is moving in a relatively periodic fashion with respect to the destination node—which may also affect the distances of all nodes in the BAN—the source node may detect and use knowledge of the periodicity to optimize the choice of paths in the set of active paths over time. The change in the distances between the nodes may create a pattern of change in the PFM for each path.

Using the example for describing FIG. 2-4, where the source node is the node 102 located on the right wrist 150b, and the destination node is the node 104 located on the left ear 150h, if the body 150 is in moving in a running motion where the right wrist 150b, the left wrist 150e, the right foot 150c, and the left foot 150d are moving forward and back in a regular fashion, then the distance between the node 102 and the node 104 may change in the same relatively regular fashion. In addition, distances between other nodes in the BAN 100 with respect to the node 102 and the node 104 as well as each other may change in the same relatively regular fashion. Thus, for example, distances between the node 102 and the nodes 104, 106, 108, and 110 may all change with respect to time, but in a periodic fashion. Any change in distances between the nodes in the BAN 100 affects the characteristics of the paths that is based on the nodes.

If a pattern is detected at 514, then at 516, sets of active paths may be created based on the detected pattern, and the connection may be changed during each period thereafter such that the paths composing the active set for a particular period may be different. As such, the update process may be minimized, and potentially eliminated during a particular period, so as to further reduce the need to perform operations such as an update the PFM of each active path. In various aspects of the disclosed approach, a pattern of change may be detected in any parameter or a combination of parameters that may affect the inclusion or exclusion of a particular path as an active path.

Figure 6:
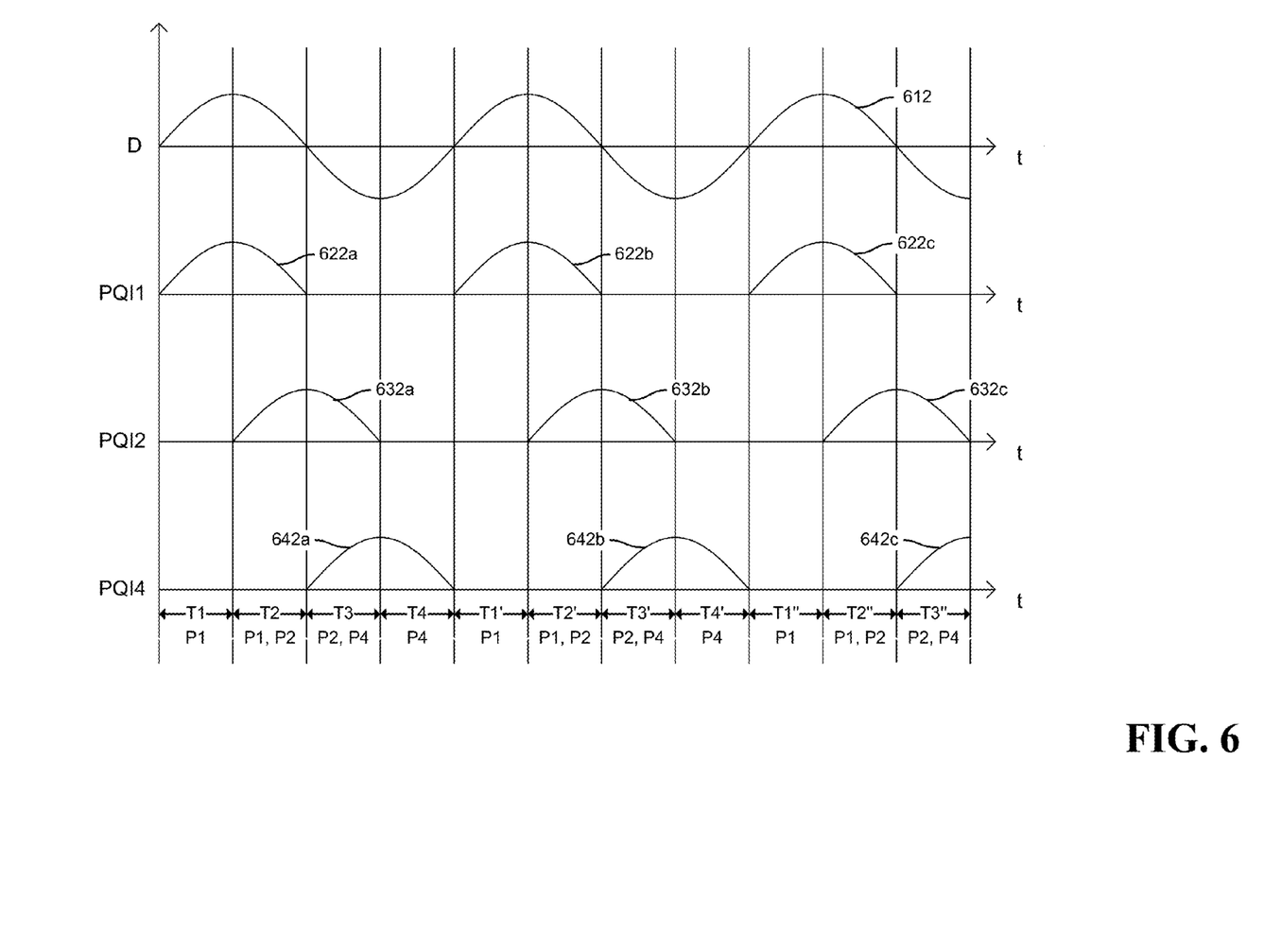
FIG. 6 is a chart illustrating an optimization approach of the connection in the BAN of FIG. 1 in accordance with certain aspects of the disclosure set forth herein.

FIG. 6 illustrates an optimization of the connection described in the example, where it is illustrates that a distance D 612 changes in a periodic fashion. To simplify the description the distance D 612 should be understood to represent a distance between the source node, such as the node 102, and the destination node, such as the node 104. However, it should be noted that the distance D 612 may represent distances between other nodes, including such nodes as the nodes 106, 108, and 110. The change in a parameter such as distance between nodes may affect the characteristics of each path. Thus, for example, an indicator such as PQI may be directly affected as it is logical that path quality may decrease/increased over longer/shorter distances because of the increased/decreased difficulties of communicating over those distances. Other path characteristics such as the PDC may be affected, where the maximum data rate for a path may decrease/increase because of the increased/decreased distance.

In this case, different paths may be used in the connection between the source node and the destination node in different situations, such as where there is a detected pattern of change in the characteristics of one or more paths. In other words, the source node may determine that only certain paths of the set of active paths may be used at certain times because there is a detected pattern in the characteristics in the active paths. For example, as further described herein, one or more paths may not be suitable for use by the source node in a particular period because of the severity of degradation of their communication characteristics in that period. In one aspect of the disclosed approach, one or more paths in the active set may be removed—that is, disassociated—from the connection during a particular period based on the pattern of change of the communication characteristics. Conversely, the one or more paths may also be reassociated with the set of active paths based on the pattern. It should be noted that the description of associating/disassociating one or more paths from an active set to create the connection is not to be limiting as to the actual effect of the communication between the source node and the destination node based on different sets of paths being used at different periods due to the determination that there is a pattern to the communication characteristics of one or more paths. Thus, the description of certain paths being disassociated from the active set may be described, in another aspect of the disclosed approach, as simply not being used for communication by the source node during certain periods, but not removed from the set of active paths.

Simplifying the example to use only PQI, the figure illustrates the changes of PQI for the paths P1 112, P2 114, and P4 118, where only a plot of each PQI above a minimum acceptable level is shown. Thus, in periods T1 and T2, it can be seen that the path P1 112 has a positive PQI illustrated by a PQI1 622a. Similarly, during the periods of T1' and T2', and T1" and T2", the path P1 112 has positive PQIs illustrated by a PQI1 622b, and a PQI1 622c. The periods where the paths P2 114 and P4 118 have a positive PQI are also shown by PQI2 632a-c and PQI4 642a-c, respectively. Examining where the PQI of each path is positive, it may be seen that a pattern of changes to the PQI may result in the following period to path association:

| Period | Active Path(s) |
|---|---|
| T1, T1', T1", . . . | P1 |
| T2, T2', T2", . . . | P1, P2 |
| T3, T3', T3", . . . | P2, P4 |
| T4, T4', T4", . . . | P4 | where time periods T1, T2, T3, and T4, repeat in a pattern. Thus, the source node may utilize the detection of the pattern of the signal quality or criteria to alternate between different sets of paths for different periods of time. In other words, the path P1 112 may be the only path in the set of active paths used by the source node to communicate with the destination node during periods T1, T1', T1", etc. Then, in periods T2, T2', T2", etc., the paths P1 112 and P2 114 may be the only paths used in the set of active paths. Further, the paths P2 114 and P4 118 may be the only paths used in the set of active paths during periods T3, T3', T3", etc. Further still, in periods T4, T4', T4", etc., the path P4 118 may be the only path used in the set of active paths. As discussed above, in one aspect of the disclosed approach, one or more active paths may be disassociated from the connection based on a determined pattern. In another aspect of the disclosed approach, one or more active path may still be associated with the set of active paths yet not be used based on the determined pattern.

Figure 7:
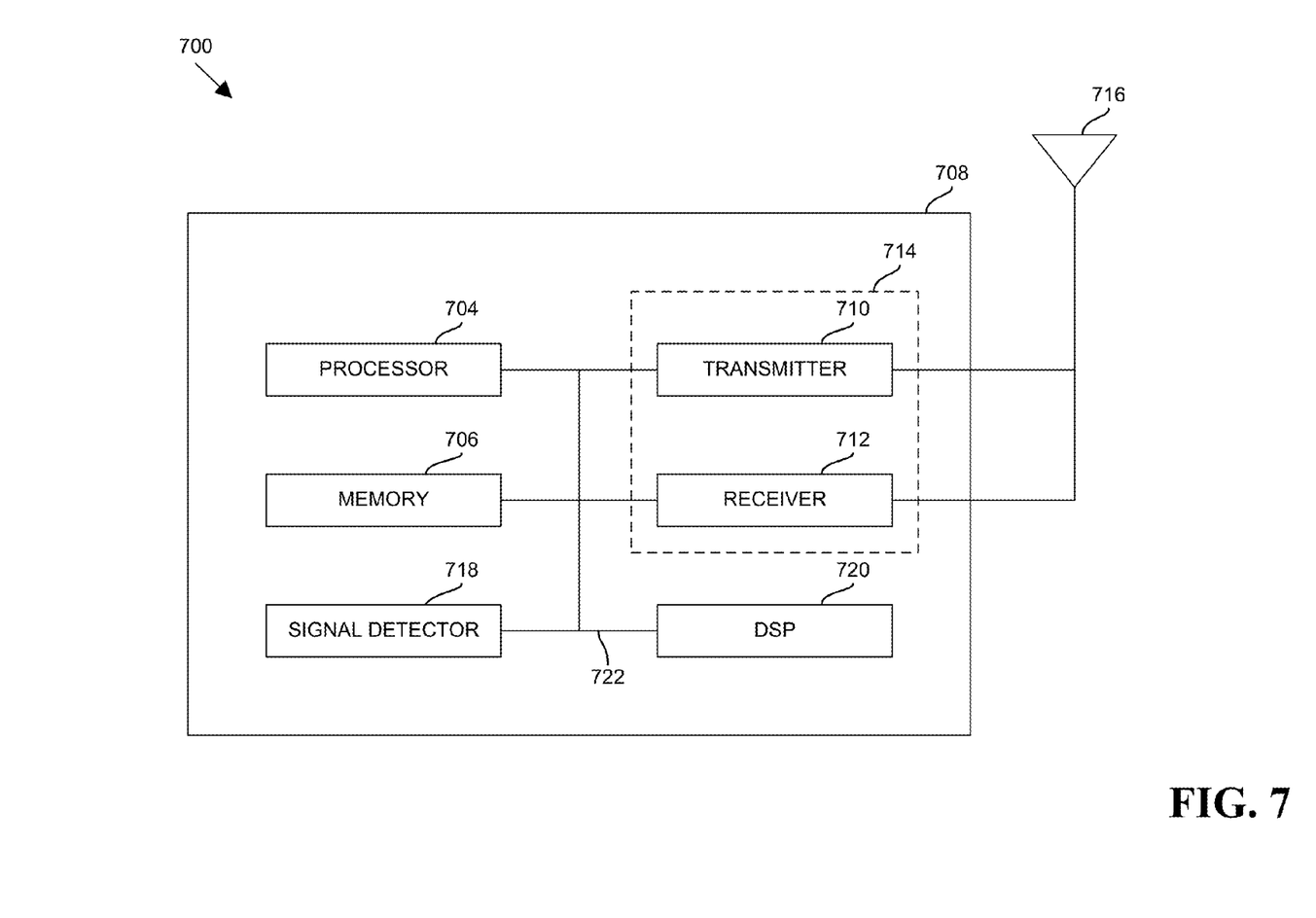
FIG. 7 is a block diagram illustrating various components that may be utilized in a wireless device of the BAN of FIG. 1 in accordance with certain aspects of the disclosure set forth herein.

FIG. 7 illustrates various components that may be utilized in a wireless device (wireless node) 700 that may be employed within the system set forth herein. The wireless device 700 is an example of a device that may be configured to implement the various methods described herein. Thus, for example, the wireless device 700 may be used to implement any one of the nodes mentioned herein.

The wireless device 700 may include a processor 704 that controls operation of the wireless device 700. The processor 704 may also be referred to as a central processing unit (CPU). A memory 706, which may include both read-only memory (ROM) and random access memory (RAM), provides instructions and data to the processor 704. A portion of the memory 706 may also include non-volatile random access memory (NVRAM). The processor 704 typically performs logical and arithmetic operations based on program instructions stored within the memory 706. The instructions in the memory 706 may be executable to implement the methods and algorithms described herein.

The wireless device 700 may also include a housing 708 that may include a transmitter 710 and a receiver 712 to allow transmission and reception of data between the wireless device 700 and another wireless device. The transmitter 710 and the receiver 712 may be combined into a transceiver 714. An antenna 716 may be attached to the housing 708 and electrically coupled to the transceiver 714. The wireless device 700 may also include (not shown) multiple transmitters, multiple receivers, multiple transceivers, and/or multiple antennas.

The wireless device 700 may also include a signal detector 718 that may be used in an effort to detect and quantify the level of signals received by the transceiver 714. The signal detector 718 may detect such signals as total energy, energy per subcarrier per symbol, power spectral density and other signals. The wireless device 700 may also include a digital signal processor (DSP) 720 for use in processing signals.

The various components of the wireless device 700 may be coupled together by a bus system 722, which may include a power bus, a control signal bus, and a status signal bus in addition to a data bus.

The teachings herein may be incorporated into (e.g., implemented within or performed by) a variety of apparatuses (e.g., devices). For example, one or more aspects taught herein may be incorporated into a headset (e.g., headphones, an earpiece, etc.), a microphone, a medical sensing device (e.g., a biometric sensor, a heart rate monitor, a pedometer, an EKG device, a smart bandage, etc.), a user I/O device (e.g., a watch, a remote control, a light switch, a keyboard, a mouse, etc.), a phone (e.g., a cellular phone), a personal data assistant ("PDA") or so-called smart-phone, an entertainment device (e.g., a portable media device, including music and video players), an environment sensing device (e.g., a temperature monitor), a monitoring device that may receive data from the medical or environment sensing device (e.g., a desktop, a mobile computer, etc.), a point-of-care device, a hearing aid, a set-top box, or any other suitable device. The monitoring device may also have access to data from different sensing devices via connection with a network.

As described herein, a wireless device/node in the disclosure set forth herein may include various components that perform functions based on signals that are transmitted by or received at the wireless device. A wireless device may also refer to a wearable wireless device. In some aspects the wearable wireless device may comprise a wireless headset or a wireless watch. For example, a wireless headset may include a transducer adapted to provide audio output based on data received via a receiver. A wireless watch may include a user interface adapted to provide an indication based on data received via a receiver. A wireless sensing device may include a sensor adapted to provide data to be transmitted via a transmitter.

A wireless device may communicate via one or more wireless communication links that are based on or otherwise support a BAN (e.g., supporting a wireless coverage area on the order of multiple meters) implemented using UWB technology. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., transmitter 710 and receiver 712) that may include various components (e.g., signal generators and signal processors) that facilitate communication over a wireless medium.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

The various illustrative logical blocks, methods, modules and circuits described in connection with the disclosure set forth herein may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims. The steps of a method or algorithm described in connection with the disclosure set forth herein may be embodied directly in hardware, in a software module executed by a processor, or in a combination of the two. A software module may reside in any form of storage medium that is known in the art, such as the memory 706, as described above.

Also, it is noted that the aspects may be described as a process that is depicted as a flow diagram, a call flow diagram, a structure diagram, or a block diagram (collectively and generally, a "flowchart"). Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, an algorithm, etc. When a process corresponds to a function, its termination corresponds to a return of the function to the calling function or the main function.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

A processor, such as the processor 704, may be responsible for managing the bus and general processing, including the execution of software stored on the computer-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Computer-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The computer-readable media may be embodied in a computer-program product. The computer-program product may comprise packaging materials.

The processing system may be configured as a general-purpose processing system with one or more microprocessors providing the processor functionality and external memory providing at least a portion of the computer-readable media, all linked together with other supporting circuitry through an external bus architecture. Alternatively, the processing system may be implemented with an ASIC with the processor, the bus interface, the user interface, supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on the computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as IR, radio, and microwave are included in the definition of medium. Thus, in some aspects, computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:
1. A method for wireless communications comprising:
   determining a plurality of paths from a source node to a destination node in a set of nodes;
   determining a set of path parameters for each path in the plurality of paths;
   determining a set of weights respectively associated with the set of path parameters based on a selected performance criterion for a connection between the source node and the destination node;
   determining, for each path in the plurality of paths, a Path Figure of Merit (PFM) based on a combination of the set of path parameters with the set of weights, respectively;
   associating one or more paths of the plurality of paths with the connection comprising:
      sorting the plurality of paths by the PFM of each path from a highest PFM to a lowest PFM; and
      associating one or more paths starting with the highest PFM to the connection until a sum of the PFMs of each added path is equal to or exceeds a total PFM threshold for the connection; and communicating from the source node to the destination node using the one or more paths associated with the connection.

2. The method of claim 1, further comprising disassociating at least one of the one or more paths from the connection based on the determined PFM for each path in the plurality of paths without updating the PFM.

3. The method of claim 1, wherein the communicating from the source node to the destination node comprises transmitting a message on each of the one or more paths, wherein the identical message transmitted on the one or more paths comprises redundant data.

4. The method of claim 3, wherein the transmitting the message on each of the one or more paths comprises transmitting the message on the one or more paths sequentially.

5. The method of claim 3, wherein the transmitting the message on each of the one or more paths comprises transmitting the message on the one or more paths simultaneously.

6. The method of claim 3, wherein the message is configured to be received by at least two different nodes through at least two separate links in the one or more paths, wherein each path comprises at least one of the at least two separate links.

7. The method of claim 1, wherein the set of nodes are part of a Body Area Network (BAN), and each path comprises at least one link between two nodes in BAN, the at least one link wirelessly connecting the two nodes without going through an intermediate node.

8. The method of claim 1, further comprising:
detecting a pattern of the PFM of at least one of the paths in the plurality of paths over time; and
associating the one or more paths in the plurality of paths with the connection based on the pattern.

9. The method of claim 8, wherein a first set of paths in the plurality of paths comprises a first total PFM and a second set of paths in the plurality of paths comprises a second total PFM, and associating the one or more paths in the plurality of paths with the connection based on the pattern comprises:
determining the first total PFM is preferred over the second total PFM during a first period, and the second total PFM is preferred over the first total PFM during a second period;
associating the first set of paths with the connection during the first period, and the second set of paths with the connection during the second period; and
repeating the association of the first set of paths and the second set of paths based on the pattern.

10. The method of claim 8, wherein the pattern comprises a periodicity of the PFM of the at least one of the paths in the plurality of paths based on time.

11. The method of claim 1, wherein the PFM of at least one of the plurality of paths is based on a quality of communication provided by the at least one of the plurality of paths.

12. The method of claim 1, wherein the combination of the set of path parameters with the set of weights comprises comprises a multiplication of the set of path parameters with the set of weights, respectively.

13. The method of claim 12, wherein the selected performance criterion comprises a reliability criterion, a minimize delay criterion, and a minimize power criterion; the set of weights comprises a reliability weight (Wr), a delay weight (Wd), and a power weight (Wp); and the total PFM threshold for the connection is based on Wr, Wd, and Wp.

14. The method of claim 12, wherein the set of path parameters comprises at least one of a Path Quality Indicator (PQI), a Path Power Cost (PPC), or a Path Delay Cost (PDC).

15. The method of claim 14, wherein the PFM is proportional to the PQI and inversely proportional to the PPC and the PDC.

16. The method of claim 14, wherein the PQI is based on at least one of packet success or failure, a link margin, a bit error rate, a packet error rate, or an Ep/No estimate.

17. The method of claim 16, wherein the link margin and the Ep/No estimate are received from the destination node via a message.

18. The method of claim 14, wherein the PPC is based on at least one of a current battery level, a total battery level for a device, or how often a device is recharged.

19. The method of claim 14, wherein the PDC is based on at least one of a number of hops, or a maximum data rate available for a device.

20. The method of claim 1, wherein associating the one or more paths to the connection comprises associating a path upon determining the path supports a minimum data rate.

21. An apparatus for wireless communications comprising:
means for determining a plurality of paths from a source node to a destination node in a set of nodes;
means for determining a set of path parameters for each path in the plurality of paths;
means for determining a set of weights respectively associated with the set of path parameters based on a selected performance criterion for a connection between the source node and the destination node;
means for determining, for each path in the plurality of paths, a Path Figure of Merit (PFM) including means for combining the set of path parameters with the set of weights, respectively;
means for associating one or more paths of the plurality of paths with the connection comprising:
means for sorting the plurality of paths by the PFM of each path from a highest PFM to a lowest PFM; and
means for associating one or more paths starting with the highest PFM to the connection until a sum of the PFMs of each added path is equal to or exceeds a total PFM threshold for the connection; and
means for communicating from the source node to the destination node using the one or more paths associated with the connection.

22. The apparatus of claim 21, further comprising means for disassociating at least one of the two or more paths from the connection based on the determined PFM for each path in the plurality of paths without updating the PFM.

23. The apparatus of claim 21, wherein the means for communicating from the source node to the destination node comprises means for transmitting a message on each of the one or more paths, wherein the identical message transmitted on the one or more paths comprises redundant data.

24. The apparatus of claim 23, wherein the means for transmitting the message on each of the one or more paths comprises means for transmitting the message on the at least two of the paths sequentially.

25. The apparatus of claim 23, wherein the means for transmitting the message on each of the one or more paths comprises means for transmitting the message on the one or more paths simultaneously.

26. The apparatus of claim 23, wherein the message is configured to be received by at least two different nodes through at least two separate links in the one or more paths, wherein each path comprises at least one of the at least two separate links.

27. The apparatus of claim 21, wherein the set of nodes are part of a Body Area Network (BAN), and each path comprises at least one link between two nodes in BAN, the at least one link wirelessly connecting the two nodes without going through an intermediate node.

28. The apparatus of claim 21, further comprising:
means for detecting a pattern of the PFM of at least one of the paths in the plurality of paths over time; and
means for associating the one or more paths in the plurality of paths with the connection based on the pattern.

29. The apparatus of claim 28, wherein a first set of paths in the plurality of paths comprises a first total PFM and a second set of paths in the plurality of paths comprises a second total PFM, and the means for associating the one or more paths in the plurality of paths with the connection based on the pattern comprises:
means for determining the first total PFM is preferred over the second total PFM during a first period, and the second total PFM is preferred over the first total PFM during a second period;
means for associating the first set of paths with the connection during the first period, and the second set of paths with the connection during the second period; and
means for repeating the association of the first set of paths and the second set of paths based on the pattern.

30. The apparatus of claim 28, wherein the pattern comprises a periodicity of the PFM of the at least one of the paths in the plurality of paths based on time.

31. The apparatus of claim 21, wherein the PFM of at least one of the plurality of paths is based on a quality of communication provided by the at least one of the plurality of paths.

32. The apparatus of claim 21, wherein the means for combining comprises means for multiplying the set of path parameters with the set of weights, respectively.

33. The apparatus of claim 32, wherein the selected performance criterion comprises a reliability criterion, a minimize delay criterion, and a minimize power criterion; the set of weights comprises a reliability weight (Wr), a delay weight (Wd), and a power weight (Wp); and the total PFM threshold for the connection is based on Wr, Wd, and Wp.

34. The apparatus of claim 32, wherein the set of path parameters comprises at least one of a Path Quality Indicator (PQI), a Path Power Cost (PPC), or a Path Delay Cost (PDC).

35. The apparatus of claim 34, wherein the PFM is proportional to the PQI and inversely proportional to the PPC and the PDC.

36. The apparatus of claim 34, wherein the PQI is based on at least one of packet success or failure, a link margin, a bit error rate, a packet error rate, or an Ep/No estimate.

37. The apparatus of claim 36, wherein the link margin and the Ep/No estimate are received from the destination node via a message.

38. The apparatus of claim 34, wherein the PPC is based on at least one of a current battery level, a total battery level for a device, or how often a device is recharged.

39. The apparatus of claim 34, wherein the PDC is based on at least one of a number of hops, or a maximum data rate available for a device.

40. The apparatus of claim 34, wherein the means for associating the one or more paths to the connection comprises means for associating a path upon determining the path supports a minimum data rate.

41. An apparatus for wireless communications comprising:
a processing system configured to:
determine a plurality of paths from a source node to a destination node in a set of nodes;
determine a set of path parameters for each path in the plurality of paths;
determine a set of weights respectively associated with the set of path parameters based on a selected performance criterion for a connection between the source node and the destination node;
determine, for each path in the plurality of paths, a Path Figure of Merit (PFM) based on a combination of the set of path parameters with the set of weights, respectively;
associate one or more paths of the plurality of paths with the connection by at least:
sorting the plurality of paths by the PFM of each path from a highest PFM to a lowest PFM; and
associating one or more paths starting with the highest PFM to the connection until a sum of the PFMs of each added path is equal to or exceeds a total PFM threshold for the connection; and
communicate from the source node to the destination node using the one or more paths associated with the connection.

42. The apparatus of claim 41, wherein the processing system is further configured to disassociate at least one of the one or more paths from the connection based on the determined PFM for each path in the plurality of paths without updating the PFM.

43. The apparatus of claim 41, wherein the processing system is further configured to transmit a message on each of the one or more paths, wherein the identical message transmitted on the one or more paths comprises redundant data.

44. The apparatus of claim 43, wherein the processing system is further configured to transmit the message on the one or more paths sequentially on each path.

45. The apparatus of claim 43, wherein the processing system is further configured to transmit the message on the one or more paths simultaneously on each path.

46. The apparatus of claim 43, wherein the message is configured to be received by at least two different nodes through at least two separate links in the one or more paths, wherein each path comprises at least one of the at least two separate links.

47. The apparatus of claim 41, wherein the set of nodes are part of a Body Area Network (BAN), and each path comprises at least one link between two nodes in BAN, the at least one link wirelessly connecting the two nodes without going through an intermediate node.

48. The apparatus of claim 41, wherein the processing system is further configured to:
detect a pattern of the PFM of at least one of the paths in the plurality of paths over time; and
associate the one or more paths in the plurality of paths with the connection based on the pattern.

49. The apparatus of claim 48, wherein a first set of paths in the plurality of paths comprises a first total PFM and a second set of paths in the plurality of paths comprises a second total PFM, and the processing system is further configured to:
determine the first total PFM is preferred over the second total PFM during a first period, and the second total PFM is preferred over the first total PFM during a second period;
associate the first set of paths with the connection during the first period, and the second set of paths with the connection during the second period; and
repeat the association of the first set of paths and the second set of paths based on the pattern.

50. The apparatus of claim 48, wherein the pattern comprises a periodicity of the PFM of the at least one of the paths in the plurality of paths based on time.

51. The apparatus of claim 41, wherein the PFM of at least one of the plurality of paths is based on a quality of communication provided by the at least one of the plurality of paths.

52. The apparatus of claim 41, wherein the processing system is further configured to combine the set of path parameters with the set of weights by at least multiplying the set of path parameters with the set of weights, respectively.

53. The apparatus of claim 52, wherein the selected performance criterion comprises a reliability criterion, a minimize delay criterion, and a minimize power criterion; the set of weights comprises a reliability weight (Wr), a delay weight (Wd), and a power weight (Wp); and the total PFM threshold for the connection is based on Wr, Wd, and Wp.

54. The apparatus of claim 52, wherein the set of path parameters comprises at least one of a Path Quality Indicator (PQI), a Path Power Cost (PPC), or a Path Delay Cost (PDC).

55. The apparatus of claim 54, wherein the PFM is proportional to the PQI and inversely proportional to the PPC and the PDC.

56. The apparatus of claim 54, wherein the PQI is based on at least one of packet success or failure, a link margin, a bit error rate, a packet error rate, or an Ep/No estimate.

57. The apparatus of claim 56, wherein the link margin and the Ep/No estimate are received from the destination node via a message.

58. The apparatus of claim 54, wherein the PPC is based on at least one of a current battery level, a total battery level for a device, or how often a device is recharged.

59. The apparatus of claim 54, wherein the PDC is based on at least one of a number of hops, or a maximum data rate available for a device.

60. The apparatus of claim 41, wherein the processing system is further configured to associate a path upon determining the path supports a minimum data rate.

61. A computer-program product for wireless communications, comprising:
a machine-readable storage medium comprising instructions executable to:
determine a plurality of paths from a source node to a destination node in a set of nodes;
determine a set of path parameters for each path in the plurality of paths;
determine a set of weights respectively associated with the set of path parameters based on a selected performance criterion for a connection between the source node and the destination node;
determine, for each path in the plurality of paths, a Path Figure of Merit (PFM) based on a combination of the set of path parameters with the set of weights, respectively;
associate one or more paths of the plurality of paths with the connection by at least:
sorting the plurality of paths by the PFM of each path from a highest PFM to a lowest PFM; and
associating one or more paths starting with the highest PFM to the connection until a sum of the PFMs of each added path is equal to or exceeds a total PFM threshold for the connection; and
communicate from the source node to the destination node using the one or more paths associated with the connection.

62. The computer-program product of claim 61, wherein the machine-readable storage medium further comprises instructions executable to disassociate at least one of the one or more paths from the connection based on the determined PFM for each path in the plurality of paths without updating the PFM.

63. The computer-program product of claim 61, wherein the machine-readable storage medium further comprises instructions executable to transmit a message on each of the one or more paths, wherein the identical message transmitted on the one or more paths comprises redundant data.

64. The computer-program product of claim 63, wherein the machine-readable storage medium further comprises instructions executable to transmit the message on the one or more paths sequentially on each path.

65. The computer-program product of claim 63, wherein the machine-readable storage medium further comprises instructions executable to transmit the message on the one or more paths simultaneously on each path.

66. The computer-program product of claim 63, wherein the message is configured to be received by at least two different nodes through at least two separate links in the one or more paths, wherein each path comprises at least one of the at least two separate links.

67. The computer-program product of claim 61, wherein the set of nodes are part of a Body Area Network (BAN), and each path comprises at least one link between two nodes in BAN, the at least one link wirelessly connecting the two nodes without going through an intermediate node.

68. The computer-program product of claim 61, wherein the machine-readable storage medium further comprises instructions executable to:
detect a pattern of the PFM of at least one of the paths in the plurality of paths over time; and
associate the one or more paths in the plurality of paths with the connection based on the pattern.

69. The computer-program product of claim 68, wherein a first set of paths in the plurality of paths comprises a first total PFM and a second set of paths in the plurality of paths comprises a second total PFM, and the machine-readable storage medium further comprises instructions executable to:
determine the first total PFM is preferred over the second total PFM during a first period, and the second total PFM is preferred over the first total PFM during a second period;
associate the first set of paths with the connection during the first period, and the second set of paths with the connection during the second period; and
repeat the association of the first set of paths and the second set of paths based on the pattern.

70. The computer-program product of claim 68, wherein the pattern comprises a periodicity of the PFM of the at least one of the paths in the plurality of paths based on time.

71. The computer-program product of claim 61, wherein the PFM of at least one of the plurality of paths is based on a quality of communication provided by the at least one of the plurality of paths.

72. The computer-program product of claim 61, wherein the machine-readable storage medium further comprises instructions executable to
combine the set of path parameters with the set of weights by at least multiplying the set of path parameters with the set of weights, respectively.

73. The computer-program product of claim 72, wherein the selected performance criterion comprises a reliability criterion, a minimize delay criterion, and a minimize power criterion; the set of weights comprises a reliability weight (Wr), a delay weight (Wd), and a power weight (Wp); and the total PFM threshold for the connection is based on Wr, Wd, and Wp.

74. The computer-program product of claim 72, wherein the set of path parameters comprises at least one of a Path Quality Indicator (PQI), a Path Power Cost (PPC), or a Path Delay Cost (PDC).

75. The computer-program product of claim 74, wherein the PFM is proportional to the PQI and inversely proportional to the PPC and the PDC.

76. The computer-program product of claim 74, wherein the PQI is based on at least one of packet success or failure, a link margin, a bit error rate, a packet error rate, or an Ep/No estimate.

77. The computer-program product of claim 76, wherein the link margin and the Ep/No estimate are received from the destination node via a message.

78. The computer-program product of claim 74, wherein the PPC is based on at least one of a current battery level, a total battery level for a device, or how often a device is recharged.

79. The computer-program product of claim 74, wherein the PDC is based on at least one of a number of hops, or a maximum data rate available for a device.

80. The computer-program product of claim 61, wherein the machine-readable storage medium further comprises instructions executable to associate a path upon determining the path supports a minimum data rate.

* * * * *